(12) United States Patent
Peng

(10) Patent No.: US 12,192,092 B2
(45) Date of Patent: Jan. 7, 2025

(54) BIER PACKET FORWARDING METHOD, DEVICE, APPARATUS, AND STORAGE MEDIUM

(71) Applicant: ZTE CORPORATION, Shenzhen (CN)

(72) Inventor: Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 326 days.

(21) Appl. No.: 17/787,897

(22) PCT Filed: Dec. 7, 2020

(86) PCT No.: PCT/CN2020/134242
§ 371 (c)(1),
(2) Date: Jun. 21, 2022

(87) PCT Pub. No.: WO2021/121065
PCT Pub. Date: Jun. 24, 2021

(65) Prior Publication Data
US 2023/0040579 A1 Feb. 9, 2023

(30) Foreign Application Priority Data
Dec. 20, 2019 (CN) .......................... 201911329040.X

(51) Int. Cl.
*H04L 45/02* (2022.01)
*H04L 45/50* (2022.01)
*H04L 69/22* (2022.01)

(52) U.S. Cl.
CPC .............. *H04L 45/02* (2013.01); *H04L 45/50* (2013.01); *H04L 69/22* (2013.01)

(58) Field of Classification Search
CPC ... H04W 72/542; H04W 72/00; H04W 72/23; H04W 24/10; H04L 5/0098; H04L 5/001
(Continued)

(56) References Cited

U.S. PATENT DOCUMENTS

2019/0097943 A1* 3/2019 Kotalwar .............. H04L 49/201
2019/0342213 A1* 11/2019 Asati ........................ H04L 45/64
(Continued)

FOREIGN PATENT DOCUMENTS

CN 107968750 A 4/2018
CN 108667731 A 10/2018
(Continued)

OTHER PUBLICATIONS

European Search Report in Application No. 20903588.0, dated May 26, 2023, 11 pages.
(Continued)

*Primary Examiner* — Candal Elpenord
(74) *Attorney, Agent, or Firm* — Morgan, Lewis & Bockius LLP

(57) ABSTRACT

A BIER packet forwarding method is applied to a packet sending node and includes: setting node information of a BIER forwarding neighboring node in a BIFT forwarding entry; in a case of determining according to the node information that the BIER forwarding neighboring node has a capability of processing a target packet format, encapsulating a BIER packet according to the target packet format; and sending an encapsulated BIER packet to the BIER forwarding neighboring node.

12 Claims, 8 Drawing Sheets

(58) Field of Classification Search
USPC .......................................................... 370/392
See application file for complete search history.

(56) References Cited

U.S. PATENT DOCUMENTS

| | | | |
|---|---|---|---|
| 2019/0356500 A1 | 11/2019 | Wijnands et al. | |
| 2019/0386837 A1* | 12/2019 | Zhang | H04L 12/18 |
| 2019/0386850 A1* | 12/2019 | Zhang | H04L 45/50 |
| 2019/0394055 A1* | 12/2019 | Zhang | H04L 69/22 |
| 2020/0344162 A1* | 10/2020 | Dutta | H04L 47/724 |
| 2021/0058260 A1* | 2/2021 | Xia | H04L 12/4633 |
| 2022/0239590 A1* | 7/2022 | Xie | H04L 45/04 |

FOREIGN PATENT DOCUMENTS

| | | |
|---|---|---|
| CN | 108696438 A | 10/2018 |
| CN | 108989209 A | 12/2018 |
| CN | 109660460 A | 4/2019 |
| CN | 109729012 A | 5/2019 |
| CN | 109756425 A | 5/2019 |
| WO | WO-2018184487 A1 | 10/2018 |
| WO | WO2018/22840 A1 | 12/2018 |
| WO | WO2018/228490 A1 | 12/2018 |

OTHER PUBLICATIONS

Xie Huawei Technologies L Geng China Mobile M Mcbride Futurewei R Asati Cisco S Dhanaraj Huawei J: "Encapsulation for BIER in Non-MPLS IPv6 Networks; draft-xie-bier-ipv6-encapsulation-04. txt", Encapsulation for BIER in Non-MPLS IPv6 Networks; DRAFT-XIE-BIER-IPV6-ENCAPSULATION-04.TXT; Internet-Draft: Network Working Group, Internet Engineering Task Force, IETF; Standardworkingdraft, Internet, No. 4, Dec. 11, 2019, pp. 1-18, XP015136928, Retrieved from the Internet: URL:https://tools.ietf.org/html/draft-xie-bier-ipv6-encapsulation-04.
Search Report for Chinese Application No. 201911329040.X, dated Dec. 16, 2022, 6 pages including English translation.
Office Action for Chinese Application No. 201911329040.X, dated Dec. 27, 2022, 12 pages including English translation.
International Search Report for Application No. PCT/CN2020/134242, dated Feb. 25, 2021, 4 pages including English translation.

* cited by examiner

BIER PACKET FORWARDING METHOD, DEVICE, APPARATUS, AND STORAGE MEDIUM

CROSS-REFERENCE TO RELATED APPLICATIONS

This is a National Stage Application filed under 35 U.S.C. 371 based on International Patent Application No. PCT/CN2020/134242, filed on Dec. 7, 2020, which claims priority to Chinese Patent Application No. 201911329040.X filed with the China National Intellectual Property Administration (CNIPA) on Dec. 20, 2019, the contents of which are incorporated herein by reference in their entireties.

This application claims priority to Chinese Patent Application No. 201911329040.X filed with the China National Intellectual Property Administration (CNIPA) on Dec. 20, 2019, the disclosure of which is incorporated herein by reference in its entirety.

TECHNICAL FIELD

The present application relates to the field of data communication, for example, a Bit Indexed Explicit Replication (BIER) packet forwarding method and apparatus, a device and a storage medium.

BACKGROUND

The Request For Comments (RFC) 8279 specifies a BIER architecture, which is a new architecture for the forwarding of multicast data packets and provides an optimal path for the forwarding of multicast data packets through a multicast domain. The BIER architecture does not require the use of a protocol for building multicast distribution trees, nor does require intermediate nodes to maintain any per-flow state. When a multicast packet arrives from outside the domain at a Bit-Forwarding Ingress Router (BFIR), the BFIR determines a sub-domain (SD) in which the packet will be sent and determines the Bit-Forwarding Egress Routers (BFERs) to which the packet will be sent. Then, the BFIR inserts a "BIER header" in the packet header. The BIER header contains a BitString in which each bit represents a Bit-Forwarding Router-identifier (BFR-id) of the corresponding BFER. The number of BFERs to which a packet can be forwarded is limited only by the BitString Length (BSL). It is possible that the number of BFERs in a sub-domain is greater than the BSL. To accommodate this case, a Set Identifier (SI) is introduced into the BIER header. It is the SI and the BitString together that determine the BFERs to which a packet will be delivered. If the SI is n and the K-th bit in the BitString is 1 (the lowest bit is marked as the first bit), then the packet will be delivered to the BFER whose BFR-id is n*BSL+K.

The RFC 8296 describes multiple forms of BIER encapsulation, such as a Multiprotocol Label Switching (MPLS) BIER packet which can be used in MPLS networks and a non-MPLS BIER packet which can be used in non-MPLS networks. For the MPLS BIER packet, the Bit Index Forwarding Table-id (BIFT-id) in the BIER header is an MPLS label, through which the corresponding <SD, BSL, SI> information can be found and obtained. In this manner, the mature MPLS forwarding plane is used, and a BIER packet is identified by a hit label entry, that is, the BIER packet is essentially a label packet. However, this manner will waste a lot of label resources. For the non-MPLS BIER packet, the BIFT-id in the BIER header directly identifies a BIFT sub-table corresponding to the specific <SD, BSL, SI>. At this time, any encapsulation header (such as Ethernet, the Internet Protocol (IP), the User Datagram Protocol (UDP), or MPLS) carrying BIER packets needs to have the capability to identify BIER packets. For example, Ethernet extends the value of its protocol type field, and when the value of EtherType is 0xAB37, it is indicated that a non-MPLS BIER packet is encapsulated.

In the encapsulation manner of a non-MPLS BIER, it is not required to waste a large number of label resources. The BIFT-id corresponding to the <SD, BSL, SI> is a specific BIER resource and is very sufficient, and may be of a global meaning or a local meaning. However, for the encapsulation manner of the non-MPLS BIER, a large number of encapsulation headers need to be directly extended, such as Ethernet, the IP, the UDP, MPLS and other extended encapsulation headers, resulting in the problem of interconnection because not all vendor nodes in the network have upgraded and completed the corresponding extensions. For example, the MPLS encapsulation has no extensible protocol field to identify an inner-layer payload. Considering that MPLS has been widely deployed in networks, in the network evolution, more cases will appear where the MPLS network connects many newly-built non-MPLS BIER islands. However, there is no scheme for the forwarding of BIER packets in network domains of different protocol packet formats.

SUMMARY

The present application provides a BIER packet forwarding method and apparatus, a device and a storage medium.

A BIER packet forwarding method applied to a packet sending node is provided and includes the following.

Node information of a BIER forwarding neighboring node is set in a Bit Index Forwarding Table (BIFT) forwarding entry; in a case where it is determined according to the node information that the BIER forwarding neighboring node has a capability of processing a target packet format, a BIER packet is encapsulated according to the target packet format; and an encapsulated BIER packet is sent to the BIER forwarding neighboring node.

A BIER packet forwarding method applied to a packet forwarding node is further provided and includes the following.

A BIER packet sent by a packet sending node is received; a BNMGL incoming label map entry is searched for according to a BNMGL in the BIER packet, and in a case where it is determined according to a search result that the packet forwarding node has a capability of processing a target packet format, the BIER packet is parsed to acquire target node information; and the BIER packet is forwarded according to the target node information.

A BIER packet forwarding apparatus applied to a sending node is further provided and includes an information searching module, a packet encapsulation module and a packet sending module.

The information searching module is configured to set node information of a BIER forwarding neighboring node in a BIFT forwarding entry. The packet encapsulation module is configured to in a case of determining according to the node information that the BIER forwarding neighboring node has a capability of processing a target packet format, encapsulate a BIER packet according to the target packet format. The packet sending module is configured to send an encapsulated BIER packet to the BIER forwarding neighboring node.

A BIER packet forwarding apparatus applied to a forwarding node is further provided and includes a packet reception module, an information parsing module and a packet forwarding module.

The packet reception module is configured to receive a BIER packet sent by a packet sending node. The information parsing module is configured to search for a BNMGL incoming label map entry according to a BNMGL in the BIER packet, and in a case where it is determined according to a search result that the packet forwarding node has a capability of processing a target packet format, parse the BIER packet to acquire target node information. The packet forwarding module is configured to forward the BIER packet according to the target node information.

A device is further provided. The device includes one or more processors and a memory configured to store one or more programs. The one or more programs, when executed by the one or more processors, cause the one or more processors to implement the preceding BIER packet forwarding method.

A computer-readable storage medium is further provided. The computer-readable storage medium stores a computer program, where the computer program, when executed by a processor, implements the preceding BIER packet forwarding method.

DETAILED DESCRIPTION

Embodiments of the present application are described below in conjunction with drawings.

Figure 1:
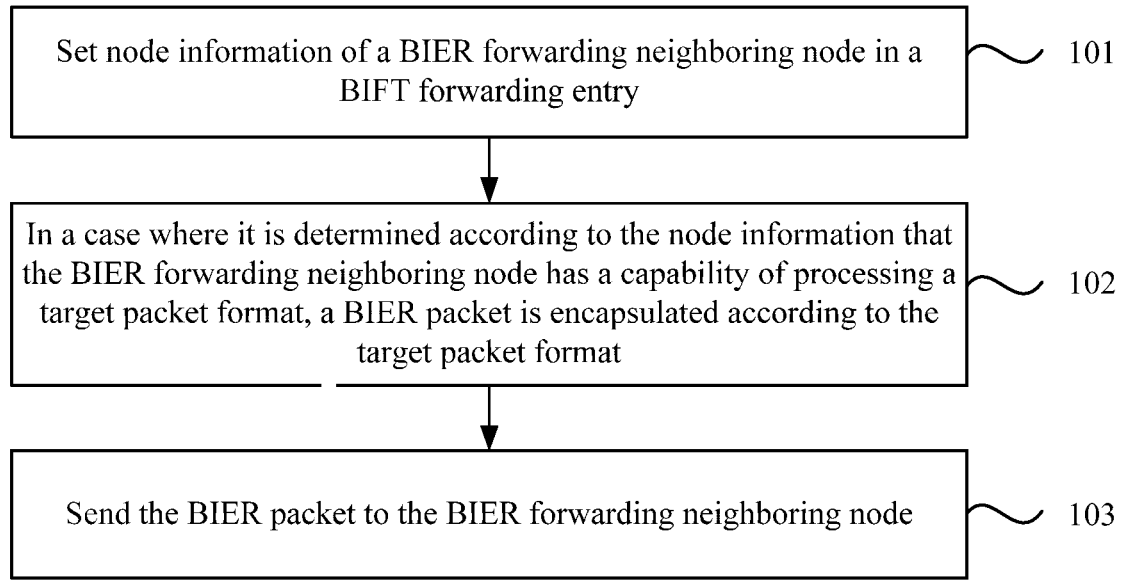
FIG. 1 is a flowchart of a BIER packet forwarding method according to an embodiment of the present application.

FIG. 1 is a flowchart of a BIER packet forwarding method according to an embodiment of the present application. The embodiment of the present application is applicable to the case of BIER packet forwarding, and the method may be executed by a BIER packet forwarding apparatus. The apparatus may be implemented by software and/or hardware and may be integrated on a sending node. Referring to FIG. 1, the BIER packet forwarding method in the embodiment of the present application includes the following.

In 101, node information of a BIER forwarding neighboring node is set in a BIFT forwarding entry.

The BIFT forwarding entry includes the node information of the BIER forwarding neighboring node. The BIER forwarding neighboring node may be a node for BIER packet forwarding, the BIER forwarding neighboring node may be in a state of being directly adjacent to or not directly adjacent to a packet sending node, and the packet sending node may perform data transmission with the BIER forwarding neighboring node. In the embodiment of the present application, the BIER forwarding neighboring node may be a Bit-Forwarding Router (BFR) node for packet forwarding according to the Interior Gateway Protocol (IGP) or the Border Gateway Protocol (BGP).

The node information may be relevant information of the forwarding neighboring node, and may comprise an identifier number of the BIER forwarding neighboring node and a packet format identifier of the BIER forwarding neighboring node. The packet format identifier may be a BIER non-MPLS Generic Label (BNMGL). Exemplarily, the BIFT forwarding entry may include a BFR-id of each BIER forwarding neighboring node, and the BFR-id may identify each BIER forwarding neighboring node for subsequent BIER packet forwarding. The BIER forwarding neighboring node may continuously search for the BIFT forwarding entry for packet forwarding according to a target node in a received BIER packet.

Figure 2A:
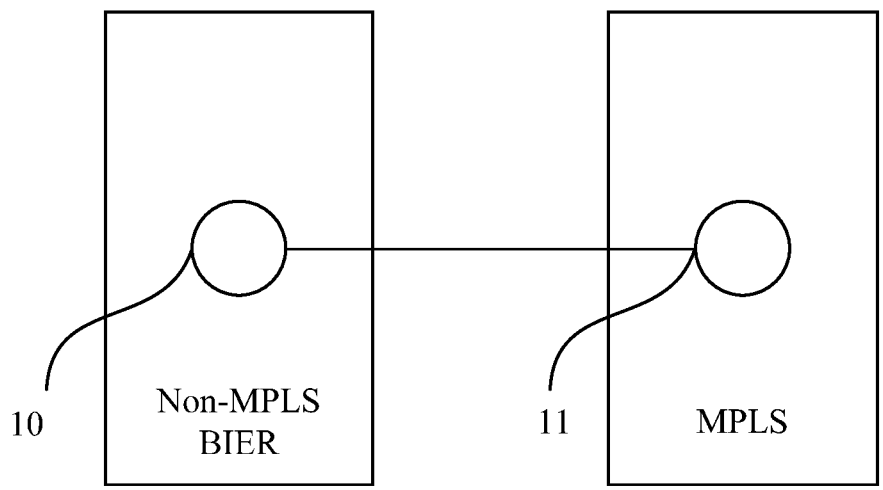
FIG. 2A is a network topology diagram according to an embodiment of the present application.
Figure 2B:
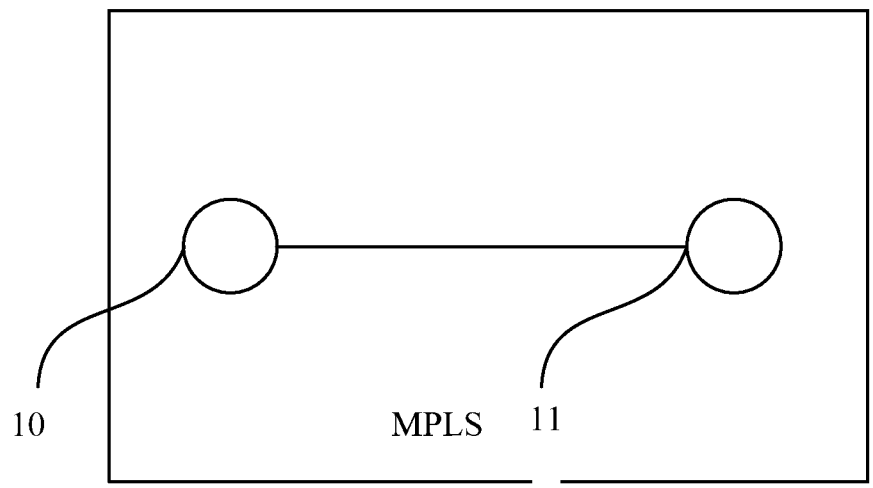
FIG. 2B is another network topology diagram according to an embodiment of the present application.

In the embodiment of the present application, the node information of the BIER forwarding neighboring node for BIER packet forwarding may be set in the BIFT forwarding entry. The BIER forwarding neighboring node may be a node directly adjacent to or not directly adjacent to the packet sending node. A BIER packet may be forwarded to the target node through the BIER forwarding neighboring node. The BIER forwarding neighboring node and the packet sending node may belong to the same network domain or different network domains. FIG. 2A is a network topology diagram according to an embodiment of the present application, and FIG. 2B is another network topology diagram according to an embodiment of the present application. Referring to FIG. 2A, the packet sending node 10 may be located in a network domain sending a packet in a Non-MPLS BIER format, and a packet forwarding node 11 may be located in a network domain sending a packet in an MPLS format. Referring to FIG. 2B, the packet sending node 10 and the BIER forwarding neighboring node 11 may be simultaneously located in a network domain sending a packet in an MPLS format.

In 102, in a case where it is determined according to the node information that the BIER forwarding neighboring node has a capability of processing a target packet format, a BIER packet is encapsulated according to the target packet format.

The target packet format may be a packet format for sending a BIER packet across network domains, and may be generated by processing a packet in a Non-MPLS BIER format. For example, the target packet format may be generated in the form of adding a BNMGL to the header of the BIER packet, and the BIER packet in the target packet format may be forwarded in an MPLS network domain.

When the BIER forwarding neighboring node joins a network domain formed by sub-domains (SDs), the BIER forwarding neighboring node may have the capability of processing the target format packet. After the BIER forwarding neighboring node declares that the BIER forwarding neighboring node joins the network domain formed by the sub-domains, other communication nodes may store the node information of the BIER forwarding neighboring node in a corresponding BIFT forwarding entry, and the sending node may encapsulate the BIER packet according to the target packet format and sends the encapsulated BIER packet. The BIER forwarding neighboring node and the sending node may be located in the same network domain or in different network domains.

In 103, the BIER packet is sent to the BIER forwarding neighboring node.

In the embodiment of the present application, after encapsulating the BIER packet according to the target packet format, the packet sending node may send the encapsulated BIER packet to the BIER forwarding neighboring node.

In the technical scheme in the embodiment of the present application, the node information of the BIER forwarding neighboring node is set in the BIFT forwarding entry, it is determined according to the node information that the BIER forwarding neighboring node has the capability of processing the target packet format, and the BIER packet is encapsulated according to the target packet format and sent. In this manner, BIER packet forwarding in different network domains is implemented, and the non-MPLS BIER packet can be carried on an MPLS tunnel, so that the interconnection problem in different network domains is solved, and communication islands caused by the incompatibility of forwarding protocols is reduced.

Figure 3:
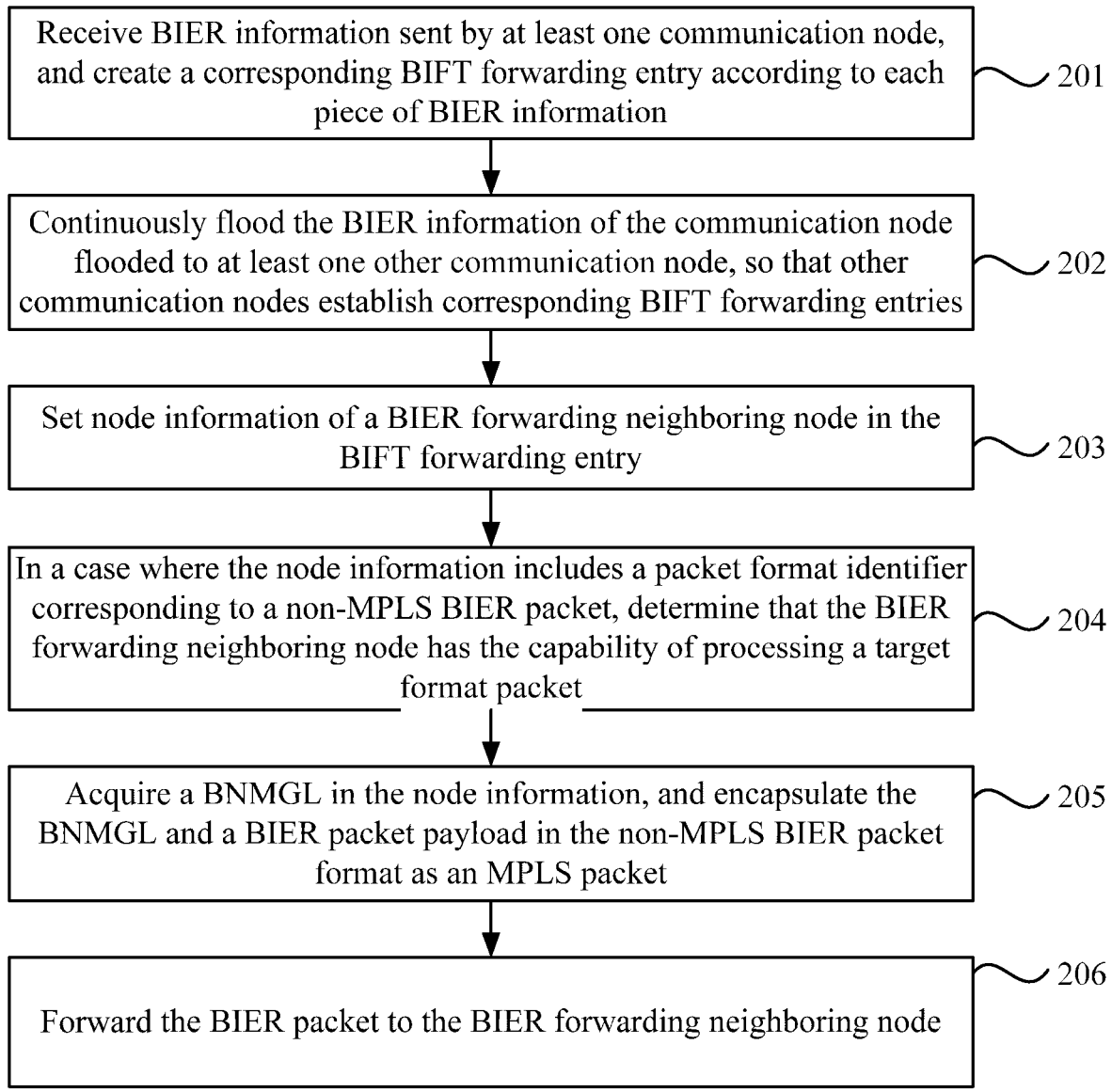
FIG. 3 is a flowchart of another BIER packet forwarding method according to an embodiment of the present application.

FIG. 3 is a flowchart of a BIER packet forwarding method according to an embodiment of the present application. The embodiment of the present application illustrates that the sending node joins the control plane. Referring to FIG. 3, the BIER packet forwarding method in the embodiment of the present application includes the following.

In 201, BIER information sent by at least one communication node is received, and a corresponding BIFT forwarding entry is created according to each piece of BIER information.

The communication node may be a node communicating with a packet sending node, or may be a BIER forwarding neighboring node. The BIER information sent by the communication node may be BIER information of the BIER forwarding neighboring node, or may be BIER information of other communication nodes forwarded by the BIER forwarding neighboring node. The BIER information may include a BNMGL, and when the BIER information includes the BNMGL, the communication node corresponding to the BNMGL may send a non-MPLS BIER packet.

Before the BIER packet forwarding is performed, communication nodes participating in the packet forwarding need to join the same sub-domain network domain. Each communication node may send a declaration to other communication nodes in the same network domain to join the sub-domain network domain. The packet sending node may receive BIER information sent by communication nodes in the same sub-domain network domain; and after acquiring BIER information sent by each communication node, the packet sending node may store the BIER information in a corresponding BIFT forwarding entry to facilitate subsequent BIER packet forwarding.

Exemplarily, it is assumed that all communication nodes belong to the same IGP domain, and each communication node establishes a mapping between <SD, BSL, SI> and a BIFT-id within the communication node. A communication node BFR-1 may establish <SD=0, BSL=256, SI=0>, and the corresponding BIFT-id is 1. The mapping relationship between the BIFT-id and the <SD, BSL, SI> may be configured globally and statically, and at this time, BIFT-id values maintained on multiple nodes are the same and have a global meaning; or the mapping relationship may be sent to other communication nodes through the IGP, and at this time, the BIFT-id values maintained on multiple nodes have a local meaning and may be different from each other. When each node advertises the BIER information of the node, the node may also allocate a BNMGL used for forwarding a BIER packet in a target packet format to advertise together, and the sending node may store the received BNMGL in a corresponding BIFT forwarding entry. The BIFT forwarding entry established at the sending node for other communication nodes may be expressed as follows:

KEY: BFR-id (the BFR-id of BFER-1 or the BFR-id of BFER-2)

Forwarding Info:
  Flag: encapsulation in the format of non-MPLS BIER
  Inner-label: BNMGL-200
  Next-hop: non-directly connected BFR-2
  Forwarding Bit Mask (F-BM): a bit string including the BFR-id of BFER-1 and the BFR-id of BFER-2.

Flag may represent an encapsulation identifier of a packet format, and may be used for determining whether a capability of processing a target packet format exists. Inner-label may represent an internal label used for packet cross-domain sending. Next-hop may represent the next hop of packet forwarding. F-BM may represent a bit string including identifier information of multiple target nodes.

In 202, the BIER information of the communication node is continuously flooded to at least one other communication node, so that other communication nodes establish corresponding BIFT forwarding entries.

A packet sending node may be a packet sending node or a packet forwarding node. For example, when a remote node sends a BIER packet to another remote node through a packet sending node, the packet sending node may be a forwarding node.

In the embodiment of the present application, before performing BIER packet sending, the packet sending node may continuously send the acquired BIER information, for example, may send the BIER information to other communication nodes, so that other communication nodes can also establishes BIFT forwarding entries according to the BIER information. The packet sending node also floods the BIER information of the packet sending node, and joins the same sub-domain as the other nodes by flooding the BIER information of the packet sending node to other nodes. Other communication nodes may establish BIFT forwarding entries within the communication nodes according to the received BIER information.

In 203, node information of a BIER forwarding neighboring node is set in a BIFT forwarding entry.

In an implementation, the node information includes at least one of a node identifier, routing information, a packet format identifier or a BNMGL.

In the embodiment of the present application, the node information may be relevant information of the forwarding node and may include a node identifier, routing information, a packet format identifier and a BNMGL. The node identifier may be unique identifier information in a communication network, and may be used for identifying each forwarding node. The routing information may be used for describing forwarding information of the forwarding node. The packet format identifier may identify a packet format of the packet processed by the forwarding node. For example, the flag may be encapsulated in the format of non-MPLS BIER and may indicate that the forwarding node can process a BIER packet in the non-MPLS BIER format.

In 204, if the node information includes a packet format identifier corresponding to a non-MPLS BIER packet, it is determined that the BIER forwarding neighboring node has the capability of processing a target format packet.

The node information may include the identifier of the target packet format. If the node information in the BIFT forwarding entry includes the identifier of the non-MPLS BIER packet, it may be determined that the BIER forwarding neighboring node can process the packet in the non-MPLS BIER format, and the forwarding node can process the target format packet and parses the packet in the non-MPLS BIER format.

In 205, a BNMGL in the node information is acquired, and the BNMGL and a BIER packet payload in the non-MPLS BIER packet format are encapsulated as an MPLS packet.

The BNMGL may be a general label identifying that the node has both the capability of forwarding a non-MPLS BIER packet and the capability of forwarding an MPLS label packet in the embodiment of the present application, and may be set at the bottom of a stack of the MPLS label packet. The payload behind the BNMGL may be a non-MPLS BIER packet.

Figure 4:
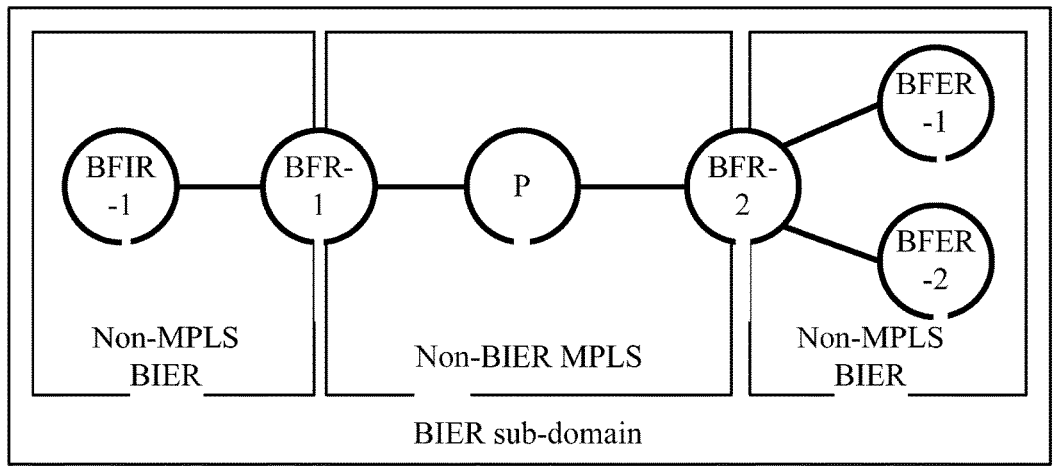
FIG. 4 is a network topology diagram of a BIER packet forwarding method according to an embodiment of the present application.

The BNMGL of the forwarding node may be acquired, and the BNMGL and the BIER packet payload in the non-MPLS BIER packet format are encapsulated together as the MPLS packet for sending in an MPLS tunnel. Exemplarily, FIG. 4 is a network topology diagram of a BIER packet forwarding method according to an embodiment of the present application. Referring to FIG. 4, nodes BFIR-1, BFR-1, BFR-2, BFER-1 and BFER-2 join the same sub-domain, and it is assumed that a multicast source resides on the BFIR-1 side, and two multicast receivers reside on the BFER-1 side and the BFER-2 side, respectively. BEIR-1 encapsulates multicast streams in the non-MPLS BIER packet encapsulation manner, and a BitString in a BIER header includes BFR-id information of BFER-1 and BFR-id information of BFER-2. The BIFT-id in the BIER header is filled in 1, that is, the packet receiver is prompted to interpret the BitString according to <SD=0, BSL=256, SI=0>. When a packet is sent to BFR-1, the non-MPLS BIER packet is directly encapsulated in an upgraded Ethernet header supporting the non-MPLS BIER packet according to the BIFT entry created on BFIR-1, and the value of Ethertype is 0xAB37. After the packet arrives at the node BFR-1 and after the BIER header is decapsulated, it is found that the BitString includes the BFR-id information of BFER-1 and the BFR-id information of BFER-2, the corresponding BIFT entry is found and hit, and the packet is continuously sent to the downstream neighbor BFR-2 in the non-MPLS BIER packet encapsulation manner. At this time, according to the flag in the BIFT entry, it is prompted that the BIER forwarding neighboring node BFR-2 supports the non-MPLS BIER packet format, so that the non-MPLS BIER packet is encapsulated with a corresponding BNMGL to form an MPLS packet, and then the MPLS packet is encapsulated in an outer layer unicast tunnel (which may be a Label Distribution Protocol (LDP) Label Switched Path (LSP), a Resource Reservation Protocol-Traffic Engineering (RSVP-TE) LSP, or a Segment Routing LSP, etc.) of BFR-2 for forwarding.

Figure 5A:
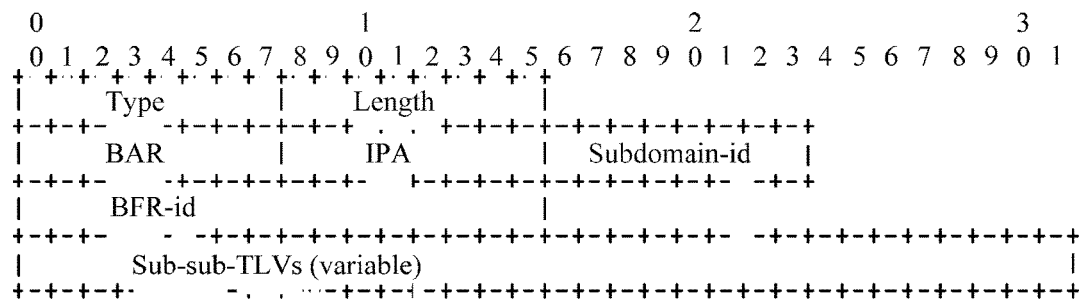
FIG. 5A is a structural diagram of a flooding packet according to an embodiment of the present application.
Figure 5B:
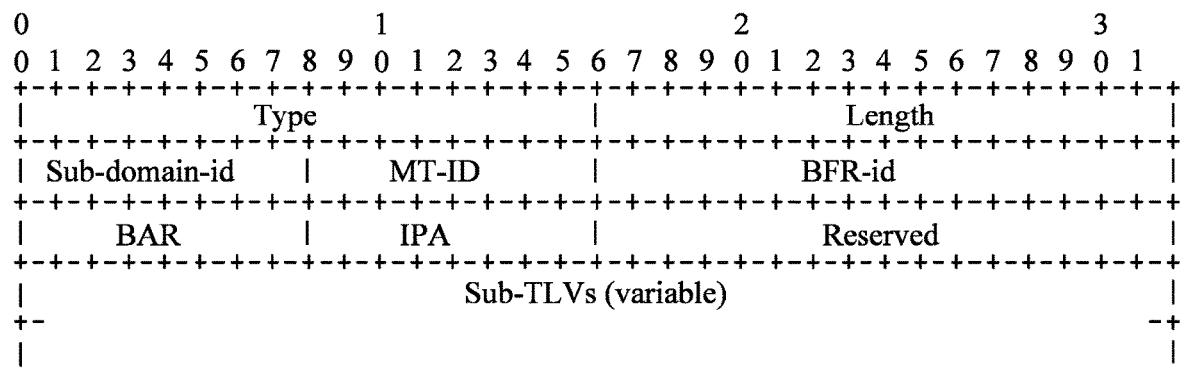
FIG. 5B is a structural diagram of another flooding packet according to an embodiment of the present application.
Figure 6A:
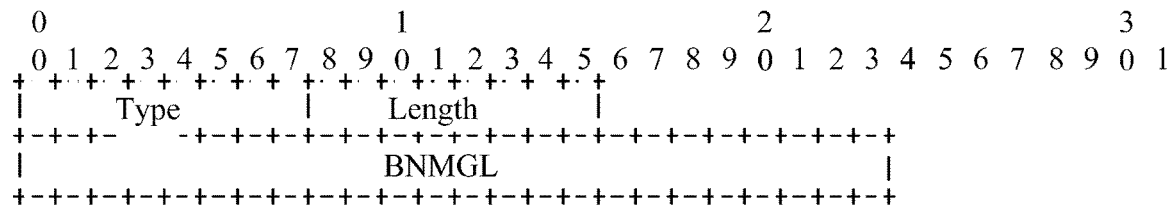
FIG. 6A is a structural diagram of a BNMGL according to an embodiment of the present application.
Figure 6B:
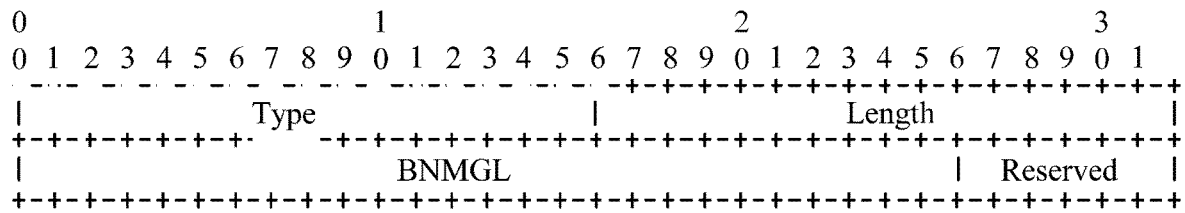
FIG. 6B is a structural diagram of another BNMGL according to an embodiment of the present application.

In the embodiment of the present application, each node may achieve the declaration of joining the sub-domain by including BIER information in a prefix reachable flooding packet of the IGP. FIG. 5A is a structural diagram of a flooding packet according to an embodiment of the present application, and FIG. 5B is a structural diagram of another flooding packet according to an embodiment of the present application. Referring to FIG. 5A, when the BIER information is advertised through the Intermediate System to Intermediate System (ISIS) protocol, the BNMGL may be carried in the BIER Infor Sub-Type-Length-Value (Sub-TLV). Referring to FIG. 5B, when the BIER information is advertised through the Open Shortest Path First (OSPF) v2 protocol, the BNMGL may be carried in the BIER Sub-TLV. The BNMGL may be used for identifying a label encapsulating a non-MPLS BIER payload in the forwarded packet, and the non-MPLS BIER payload is encapsulated behind the BNMGL in the forwarded packet. FIG. 6A and FIG. 6B are structural diagrams of the BNMGL in the ISIS protocol and the OSPFv2 protocol. Referring to FIG. 6A, the BNMGL information may be directly used as the value of the sub-sub-TLVs field in the ISIS protocol packet, and referring to FIG. 6B, the BNMGL information may be directly used as the value of the Sub-TLVs field in the OSPFv2 protocol packet.

In 206, the BIER packet is forwarded to the BIER forwarding neighboring node.

The BIER packet encapsulated in the MPLS format is sent to the BIER forwarding neighboring node, and the BIER packet may be forwarded to a receiver through the BIER forwarding neighboring node.

In the technical scheme in the embodiment of the present application, the BIER information sent by the communication node is received, the corresponding BIFT forwarding entry is created according to the BIER information, the BITF forwarding entry includes the node information of the BIER forwarding neighboring node, if the node information includes the packet format identifier corresponding to the non-MPLS BIER packet, it is determined that the BIER forwarding neighboring node has the capability of processing the target format packet, and the BNMGL and the BIER packet payload in the non-MPLS BIER packet format are encapsulated as the MPLS packet and sent to the BIER forwarding neighboring node. In this manner, the non-MPLS BIER packet is carried on an MPLS tunnel, so that the problem of packet forwarding interconnection is solved, communication islands caused by the incompatibility of forwarding protocols is reduced, and the compatibility of the BIER packet is different protocols is enhanced.

Figure 7:
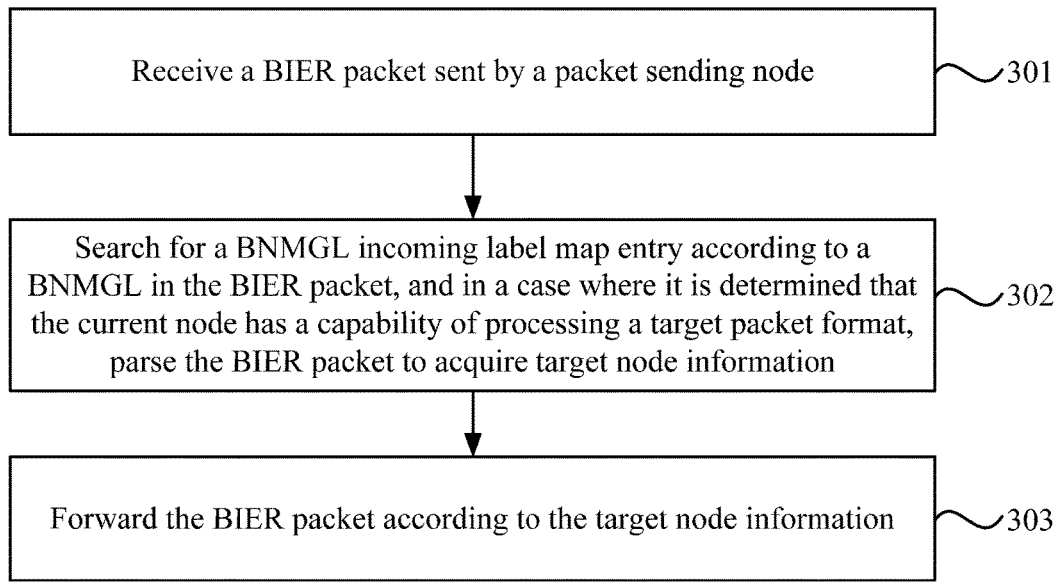
FIG. 7 is a flowchart of another BIER packet forwarding method according to an embodiment of the present application.

FIG. 7 is a flowchart illustrating steps of another BIER packet forwarding method according to an embodiment of the present application. The embodiment of the present application is applicable to the case of BIER packet forwarding, and the method may be executed by a BIER packet forwarding apparatus. The apparatus may be implemented by software and/or hardware and may be integrated on a forwarding node. Referring to FIG. 7, the BIER packet forwarding method in the embodiment of the present application includes the following.

In 301, a BIER packet sent by a packet sending node is received.

The packet sending node may be a residence node of a multicast source in a communication network, and the packet sending node may send a BIER packet to a forwarding node.

A packet forwarding node may receive the BIER packet sent by the packet sending node. The packet forwarding node and the packet sending node may be in the same network domain or in different network domains. The packet sending node, the packet forwarding node and a packet reception node may pre-advertise through the IGP/BGP to join the same sub-domain.

In 302, a BNMGL incoming label map entry is searched for according to a BNMGL in the BIER packet, and when it is determined that the current node has a capability of processing a target packet format, the BIER packet is parsed to acquire target node information.

The target packet format may be a non-MPLS BIER packet format. The BNMGL may be added at the bottom of a label stack of an MPLS packet, and the BNMGL is followed by a non-MPLS BIER packet payload. The key value of the BNMGL incoming label map entry is the BNMGL of the current forwarding node. A sending node may be a sending node or a forwarding node. For example, when a remote node sends a BIER packet to another remote node through a sending node, the sending node may be a forwarding node.

Whether the capability of processing the target packet format existing may be first determined. For example, when a label forwarding entry is found according to a current top-level label of the forwarded packet, a local BNMGL incoming label map entry can be hit, and thus it can be determined that the capability of processing the target format exists. The BIER packet may be parsed according to the target packet format to acquire the target node information in the packet payload. For example, the BNMGL is popped out first to acquire the non-MPLS BIER packet payload behind the BNMGL.

Exemplarily, a BNMGL incoming label map entry may be expressed as the following format:

KEY: BNMGL-200
Forwarding Info:
  Label Operation: POP
  Flag: non-MPLS BIER payload.

Label Operation may represent an operation type, and Flag may represent a load identifier and may be used for identifying the operation type and the load type of a packet which can be processed. For example, when the Flag identifier is a non-MPLS BIER payload, the forwarding node can process a packet load of the non-MPLS BIER type.

In 303, the BIER packet is forwarded according to the target node information.

In the technical scheme in the embodiment of the present application, the BIER packet sent by the sending node is received, when it is determined according to the BNMGL in the BNMGL incoming label map entry that the packet forwarding node has the capability of processing the target packet format, the BIER packet is parsed to acquire the target node information, and the BIER packet is forwarded according to the target node information. In this manner, the compatibility of different communication protocols is achieved, the non-MPLS BIER packet can be carried on an MPLS tunnel, and the compatibility of BIER packet forwarding is improved, so that the interconnection problem caused by communication protocols can be solved, and the occurrence of communication islands is reduced.

Figure 8:
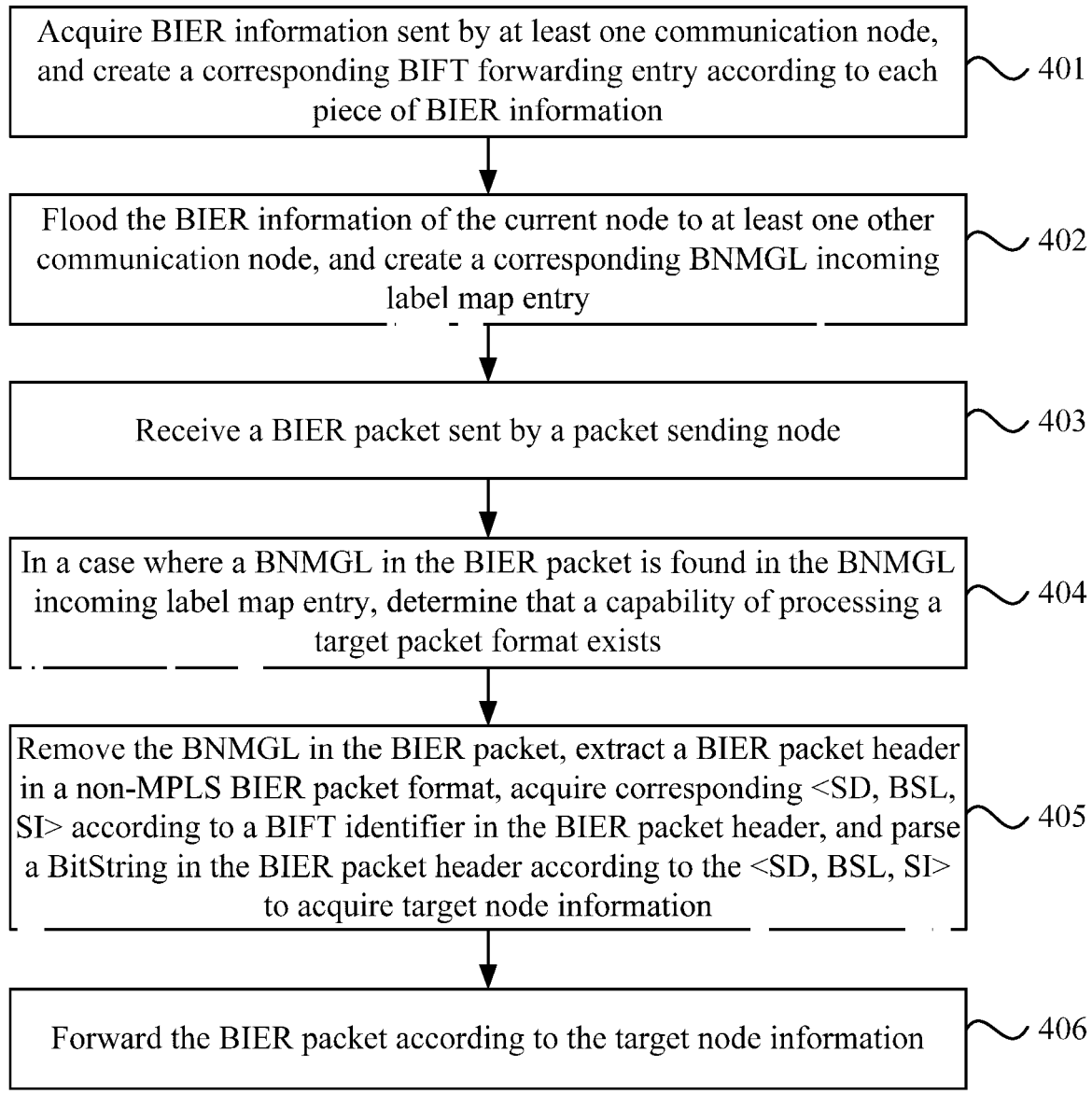
FIG. 8 is a flowchart of another BIER packet forwarding method according to an embodiment of the present application.

FIG. 8 is a flowchart of another BIER packet forwarding method according to an embodiment of the present application. The technical scheme in the embodiment of the present application illustrates that the forwarding node joins the control plane. Referring to FIG. 8, the BIER packet forwarding method in the embodiment of the present application includes the following.

In 401, BIER information sent by at least one communication node is acquired, and a corresponding BIFT forwarding entry is created according to each piece of BIER information.

Before the BIER packet forwarding is performed, communication nodes participating in the packet forwarding need to join the same sub-domain network domain. Each communication node may send a declaration to other communication nodes in the same network domain to join the sub-domain network domain. The packet forwarding node may receive BIER information sent by communication nodes in the same sub-domain network domain; and after acquiring the BIER information sent by each communication node, the packet forwarding node may create a corresponding BIFT forwarding entry according to the BIER information to facilitate subsequent BIER packet forwarding.

In 402, the BIER information of the current node is flooded to at least one other communication node, and a corresponding BNMGL incoming label map entry is created.

The packet forwarding node may flood the BIER information of the packet forwarding node to other nodes through the IGP/BGP to join the same sub-domain. The packet forwarding node may create the corresponding BNMGL incoming label map entry according to the BNMGL in the BIER information of the packet forwarding node.

In 403, a BIER packet sent by a packet sending node is received.

In 404, when a BNMGL in the BIER packet is found in the BNMGL incoming label map entry, a capability of processing a target packet format exists.

In 405, the BNMGL in the BIER packet is removed, a BIER packet header is extracted in a non-MPLS BIER packet format, corresponding <SD, BSL, SI> is acquired according to a BIFT-id in the BIER packet header, and a BitString in the BIER packet header is parsed according to the <SD, BSL, SI> to acquire target node information.

When parsing the BIER packet, the forwarding node pops the BNMGL out first, acquires the BIFT-id through the non-MPLS BIER format, acquires the <SD, BSL, SI> according to the BIFT-id, and parse the BitString information according to the <SD, BSL, SI> to acquire the target node information. Exemplarily, after the BIER packet arrives at the forwarding node BFR-2, the incoming label map (ILM) entry of the preceding forwarding node is found and hit according to the top-level label BNMGL-200 of the packet, the label BNMGL-200 is popped out, the packet is continuously interpreted according to the format of a non-MPLS BIER payload, the BitString is interpreted according to that the BIFT-id in a BIER header is 1 and according to <SD=0, BSL=256, SI=0>, and the BFR-id information of BFER-1 and the BFR-id information BFER-2 included in the BitString are acquired and used as the target node information.

In 406, the BIER packet is forwarded according to the target node information.

A BIER forwarding neighboring node which can forward the BIER packet may be found in the BIFT forwarding entry according to the target node information, and the BIER packet may be forwarded to the BIER forwarding neighboring node and may be continuously forwarded by the BIER forwarding neighboring node until being forwarded to the target node.

Figure 9:
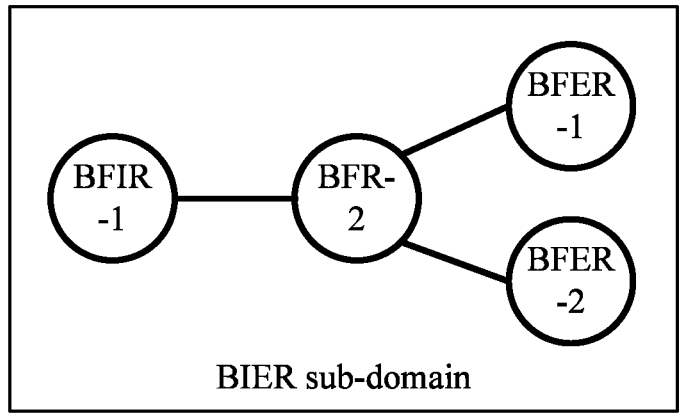
FIG. 9 is a network topology diagram of another BIER packet forwarding method according to an embodiment of the present application.

Exemplarily, FIG. 9 is a network topology diagram of another BIER packet forwarding method according to an embodiment of the present application. The non-MPLS BIER encapsulation manner may also be adopted in a complete MPLS domain so as to save label resources. As shown in FIG. 9, it is assumed that all the nodes in FIG. 9 are within the same IGP domain (at the ISIS level or in the OSPF area), these nodes enable the BIER and flood the BIER information of these nodes for joining BIER sub-domain 0 through the IGP, and BIER sub-domain 0 includes an area composed of nodes BFIR-1, BFR-1, BFER-1 and BFER-2 and connected links of these nodes. It is assumed that a mapping relationship between the <SD, BSL, SI> and the BIFT-id is established on each node of BIER sub-domain 0 through static configuration or other dynamic learning manners, such as the corresponding BIFT-id of <SD=0, BSL=256, SI=0> is 1. The BIER packet forwarding method includes the following.

In 411, the nodes BFIR-1, BFR-1, BFER-1 and BFER-2 flood the BIER information of the nodes through the IGP to join BIER sub-domain 0, and the advertised BIER information includes a BNMGL locally allocated for the present node to support non-MPLS BIER encapsulation. For example, the BNMGL allocated for the node BFR-1 is BNMGL-100, and a corresponding ILM entry is established on the node BFR-1 for BNMGL-100 as follows:

KEY: BNMGL-100
Forwarding Info:
Label Operation: POP
Flag: non-MPLS BIER payload.

Similarly, the nodes BFER-1 and BFER-2 are also allocated with BNMGLs, that is, BNMGL-1000 and BNMGL-2000, respectively, and corresponding ILM entries are established as above.

In 412, the BIFT entry of BFER-1 and the BIFT entry of BFER-2 are respectively established on the node BFR-1, and next hops of the BIFT entry of BFER-1 and the BIFT entry of BFER-2 are both directly connected next hops. Since the non-MPLS BIER packet encapsulation manner is used, and BFR-1 receives the BNMGL advertisement of the corresponding next hop node, BFR-1 may choose to introduce a BNMGL into the BIFT entry according to a local policy, regardless of whether the next hop node in the BIFT entry is directly connected. The forwarding information of the BIFT entry of BFER-1 and the BIFT entry of BFER-2 may be expressed as follows:

KEY: BFR-id (BFER-1)
Forwarding Info:
Flag: encapsulation in the format of non-MPLS BIER
Inner-label: BNMGL-1000
Next-hop: directly connected BFER-1
F-BM: a bit string including the BFR-id of BFER-1;
KEY: BFR-id (BFER-2)
Forwarding Info:
Flag: encapsulation in the format of non-MPLS BIER
Inner-label: BNMGL-2000
Next-hop: directly connected BFER-2
F-BM: a bit string including the BFR-id of BFER-2.

In 413, similarly, the BIFT entry of BFER-1 and the BIFT entry of BFER-2 are respectively established on BFIR-1, and BFIR-1 chooses to introduce a BNMGL into the BIFT entry according to a local policy, regardless of whether the next hop of the BIFT entry is directly connected. The BIFT entry of BFER-1 and the BIFT entry of BFER-2 are as follows:

KEY: BFR-id (the BFR-id of BFER-1 or the BFR-id of BFER-2)
Forwarding Info:
Flag: encapsulation in the format of non-MPLS BIER
Inner-label: BNMGL-100
Next-hop: directly connected BFR-1
F-BM: a bit string including the BFR-id of BFER-1 and the BFR-id of BFER-2.

In 414, it is assumed that a multicast source resides on the BFIR-1 side, and two multicast receivers reside on the BFER-1 side and the BFER-2 side, respectively. BFIR-1 encapsulates multicast streams in the non-MPLS BIER packet encapsulation manner, and the BitString in a BIER header includes the BFR-id information of BFER-1 and the BFR-id information of BFER-2. The BIFT-id in the BIER header is filled in 1, that is, the packet receiver is prompted to interpret the BitString according to <SD=0, BSL=256, SI=0>. When a packet is sent to BFR-1, according to the BIFT entry created on BFIR-1, the non-MPLS BIER packet is encapsulated with the label BNMGL-100 to form an MPLS packet, and then the MPLS packet is encapsulated with a layer 2 link header (such as Ethernet).

In 415, after the packet arrives at the node BFR-1, the preceding ILM entry is found and hit according to the top-level label BNMGL-100 of the packet, the label BNMGL-100 is popped out, the packet is continuously interpreted according to the format of a non-MPLS BIER payload, and the BitString is interpreted according to that the BIFT-id in the BIER header is 1 and according to <SD=0, BSL=256, SI=0>. When it is found that the BitString includes the BFR-id information of BFER-1 and the BFR-id information of BFER-2, the packet is replicated and sent to BFER-1 and BFER-2 respectively according to the BIFT entry created on BFR-1. The non-MPLS BIER packet is encapsulated with the label BNMGL-1000 (when sent to BFER-1) or the label BNMGL-2000 (when sent to BFER-2) first to form an MPLS packet, and then the MPLS packet is encapsulated with a layer 2 link header (such as Ethernet).

In 416, after the packet arrives at BFER-1 and BFER-2, respectively, the internal payload encapsulated in the non-MPLS BIER is decapsulated.

In the technical scheme in the embodiment of the present application, the packet sending node acquires the BIER information sent by the communication node to establish the corresponding BIFT forwarding entry, and the packet forwarding node floods the BIER information of the packet forwarding node to other communication nodes and establish the corresponding BNMGL incoming label map entry. The packet forwarding node receives the BIER packet sent by the packet sending node, the corresponding BNMGL incoming label map entry is found according to the top-level label of the packet to determine the capability of processing the target packet format, the BNMGL of the BIER packet is removed, the BIER packet header is extracted in the non-MPLS BIER packet format, the corresponding <SD, BSL, SI> is acquired according to the BIFT-id in the BIER packet and the Bitstring in the BIER packet header is parsed accordingly, the target node information is acquired, and then the BIER packet is continuously forwarded by searching for the BIFT entry according to the target node information. In this manner, the compatibility of different communication protocols is achieved, the non-MPLS BIER packet can be carried on an MPLS tunnel, and the compatibility of BIER packet forwarding is improved, so that the interconnection problem caused by communication protocols can be solved, and the occurrence of communication islands is reduced.

In an implementation, that the BIER information of the current node is flooded to at least one other node, and the corresponding BNMGL incoming label map entry is created includes: a BNMGL of the current node is allocated, the BNMGL is included in BIER information in a prefix reachable flooding packet, and the flooding packet is flooded and sent to at least one communication node; and the BNMGL incoming label map entry is created with the BNMGL as a key value, where the BNMGL incoming label map entry further includes an operation type and a load mark.

The BIER information may be flooded with the prefix reachable packet to achieve the declaration of joining the sub-domain, and when the BIER information is advertised through the ISIS protocol, the BNMGL may be carried in the BIER Info Sub-TLV. When the BIER information is advertised through the OSPFv2 protocol, the BNMGL may be carried in the BIER Sub-TLV. The BNMGL may be used for identifying that the BNMGL in the forwarded packet is followed by a non-MPLS BIER payload. The BNMGL incoming label map entry further includes an operation type and a load mark.

Figure 10:
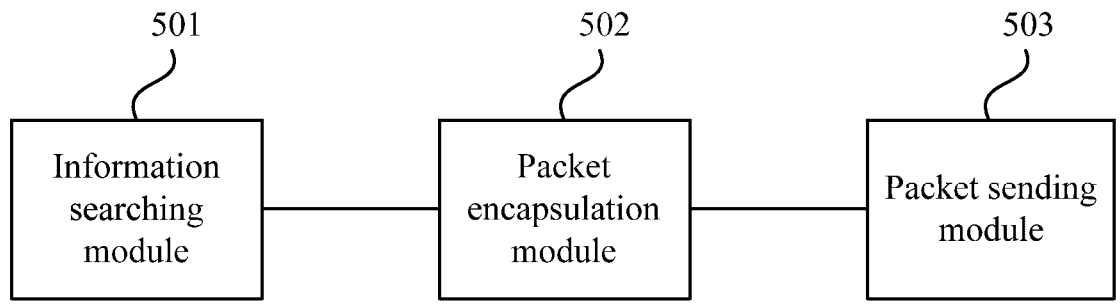
FIG. 10 is a structural diagram of a BIER packet forwarding apparatus according to an embodiment of the present application.

FIG. 10 is a structural diagram of a BIER packet forwarding apparatus according to an embodiment of the present application. The BIER packet forwarding apparatus provided by the embodiment of the present application may execute the BIER packet forwarding method provided by any embodiment of the present application, and has the corresponding function modules and effects of the executed method. The apparatus may be implemented by software and/or hardware and may be integrated in a sending node. The apparatus includes an information searching module 501, a packet encapsulation module 502 and a packet sending module 503.

The information searching module 501 is configured to set node information of a BIER forwarding neighboring node in a BIFT forwarding entry.

The packet encapsulation module 502 is configured to in a case of determining according to the node information that the BIER forwarding neighboring node has a capability of processing a target packet format according to the node information, encapsulate a BIER packet according to the target packet format.

The packet forwarding module 503 is configured to send the BIER packet to the BIER forwarding neighboring node.

In the technical scheme in the embodiment of the present application, the information searching module searches for the node information of the BIER forwarding neighboring node in the BIFT forwarding entry; the packet encapsulation module determines that the BIER forwarding neighboring node has the capability of processing the target packet format according to the node information and encapsulate the BIER packet according to the target packet format; and the packet sending module forwards the encapsulated packet. In this manner, BIER packet forwarding in different network domains is implemented, and a non-MPLS BIER packet can be carried on an MPLS tunnel, so that the interconnection problem in different network domains is solved, and communication islands caused by the incompatibility of forwarding protocols is reduced.

In an implementation, the node information involved in the information searching module 501 includes at least one of a node identifier, routing information, a packet format identifier or a BNMGL.

In an implementation, the packet encapsulation module 502 includes a capability determination unit and a packet encapsulation unit.

The capability determination unit is configured to if the node information includes a packet format identifier corresponding to a non-MPLS BIER packet, determine that the BIER forwarding neighboring node has the capability of processing a target format packet.

The packet encapsulation unit is configured to acquire a BNMGL in the node information, and encapsulate the BNMGL and a BIER packet payload in a non-MPLS BIER packet format as an MPLS packet.

In an implementation, the BIER packet forwarding apparatus further includes a forwarding entry module and an information flooding module.

The forwarding entry module is configured to receive BIER information sent by at least one communication node, and create a corresponding BIFT forwarding entry according to each piece of BIER information.

The information flooding module is configured to continuously flood the BIER information of the communication node to at least one other communication node, so that other communication nodes establish corresponding BIFT forwarding entries.

Figure 11:
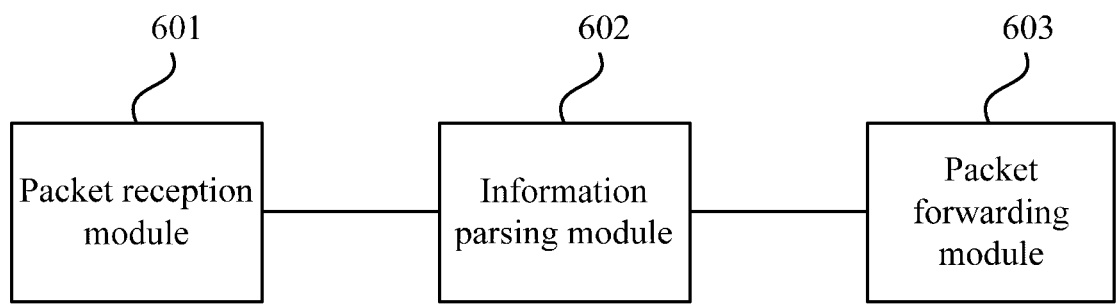
FIG. 11 is a structural diagram of another BIER packet forwarding apparatus according to an embodiment of the present application.

FIG. 11 is a structural diagram of another BIER packet forwarding apparatus according to an embodiment of the present application. The BIER packet forwarding apparatus provided by the embodiment of the present application may execute the BIER packet forwarding method provided by any embodiment of the present application, and has the corresponding function modules and beneficial effects of the executed method. The apparatus may be implemented by software and/or hardware and may be integrated in a forwarding node. The apparatus includes a packet reception module 601, an information parsing module 602 and a packet forwarding module 603.

The packet reception module 601 is configured to receive a BIER packet sent by a packet sending node.

The information parsing module 602 is configured to search for a BNMGL incoming label map entry according to a BNMGL in the BIER packet, and when it is determined that the current node has a capability of processing a target packet format, parse the BIER packet to acquire target node information.

The packet forwarding module 603 is configured to forward the BIER packet according to the target node information.

In the technical scheme in the embodiment of the present application, the packet reception module receives the BIER packet sent by the packet sending node; when the information parsing module determines that the capability of processing the target packet format exists, the information parsing module parses the BIER packet to acquire the target node information; and the packet forwarding module forwards the BIER packet according to the target node information. In this manner, the compatibility of different communication protocols is achieved, the non-MPLS BIER packet can be carried on an MPLS tunnel, and the compatibility of BIER packet forwarding is improved, so that the interconnection problem caused by communication protocols can be solved, and the occurrence of communication islands is reduced.

In an implementation, the information parsing module 602 includes a capability determination unit and an information extraction unit.

The capability determination unit is configured to when the BNMGL in the BIER packet is found in the BNMGL incoming label map entry, determine that the capability of processing the target packet format exists.

The information extraction unit is configured to remove the BNMGL in the BIER packet, extract a BIER packet header in a non-MPLS BIER packet format, acquire corresponding <SD, BSL, SI> according to a BIFT identifier in the BIER packet header, and parse a BitString in the BIER packet header according to the <SD, BSL, SI> to acquire target node information.

In an implementation, the BIER packet forwarding apparatus further includes a forwarding entry module and an incoming label entry module.

The forwarding entry module is configured to acquire BIER information sent by at least one communication node, and create a corresponding BIFT forwarding entry according to each piece of BIER information.

The incoming label entry module is configured to flood the BIER information of the current node to at least one other communication node, and create a corresponding BNMGL incoming label map entry.

In an implementation, the incoming label entry module further includes an advertisement unit and a label unit.

The advertisement unit is configured to allocate a BNMGL of the current node, include the BNMGL in BIER information in a prefix reachable flooding packet, and flood the prefix reachable flooding packet to at least one communication node.

The label unit is configured to create the BNMGL incoming label map entry with the BNMGL as a key value, where the BNMGL incoming label map entry further includes an operation type and a load mark.

Figure 12:
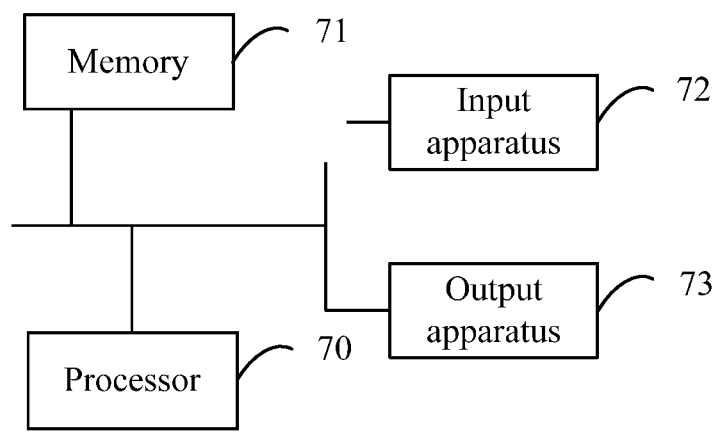
FIG. 12 is a structural diagram of a device according to an embodiment of the present disclosure.

FIG. 12 is a structural diagram of a device according to an embodiment of the present disclosure. As shown in FIG. 12, the device includes a processor 70, a memory 71, an input apparatus 12 and an output apparatus 73. One or more processors 70 may be disposed in the device, and one processor 70 is taken as an example in FIG. 12. The processor 70, the memory 71, the input apparatus 72 and the output apparatus 73 in the device may be connected by a bus or in other manners. Connecting by a bus is used as an example in FIG. 12.

The memory 71, as a computer-readable storage medium, may be configured to store software programs and computer-executable programs and modules, such as modules (the information searching module 501, the packet encapsulation module 502 and the packet sending module 503, or the packet reception module 601, the information parsing module 602 and the packet forwarding module 603) corresponding to the BIER packet forwarding apparatus in any embodiment of the present application. The processor 70 runs the software programs, instructions and modules stored in the memory 71 to execute multiple function applications and data processing of the device, that is, to implement the preceding BIER packet forwarding method.

The memory 71 may mainly include a program storage region and a data storage region. The program storage region may store an operating system and an application program required by at least one function. The data storage region may store data created depending on the use of a terminal. Additionally, the memory 71 may include a high-speed random-access memory and may also include a non-volatile memory such as at least one disk memory, a flash memory or another non-volatile solid-state memory. In some examples, the memory 71 may include memories which are remotely disposed relative to the processor 70, and these remote memories may be connected to the device via a network. Examples of the preceding network include, but are not limited to, the Internet, an intranet, a local area network, a mobile communication network and a combination thereof.

The input apparatus 72 may be configured to receive input digital or character information and generate key signal input related to user settings and function control of the device. The output apparatus 73 may include display devices such as a display screen.

An embodiment of the present application further provides a storage medium including computer-executable instructions, and the computer-executable instructions are used for executing a BIER packet forwarding method when executed by a computer processor. The method includes the following.

Node information of a BIER forwarding neighboring node is set in a BIFT forwarding entry; when it is determined according to the node information that the BIER forwarding neighboring node has a capability of processing a target packet format, a BIER packet is encapsulated according to the target packet format; and the BIER packet is sent to the BIER forwarding neighboring node.

Alternatively, a BIER packet sent by a packet sending node is received; a BNMGL incoming label map entry is searched for according to the BNMGL in the BIER packet, and when it is determined that the current node has a capability of processing a target packet format, the BIER packet is parsed to acquire target node information; and the BIER packet is forwarded according to the target node information.

In the storage medium including the computer-executable instructions provided by the embodiment of the present application, the computer-executable instructions implement not only the preceding method operations but also related operations in the BIER packet forwarding method provided by any embodiment of the present application.

The term user terminal encompasses any appropriate type of wireless user device, such as a mobile phone, a portable data processing apparatus, a portable web browser or a vehicle-mounted mobile station.

In general, multiple embodiments of the present application may be implemented in hardware or special-purpose circuits, software, logic or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). The computer-readable medium may include a non-transitory storage medium. The data processor may be of any type suitable for a local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A Bit Indexed Explicit Replication (BIER) packet forwarding method, applied to a packet sending node, comprising:
   setting node information of a BIER forwarding neighboring node in a Bit Index Forwarding Table (BIFT) forwarding entry;
   in a case of determining according to the node information that the BIER forwarding neighboring node has a capability of processing a target packet format, encapsulating a BIER packet according to the target packet format; and
   sending an encapsulated BIER packet to the BIER forwarding neighboring node;
   wherein in the case of determining according to the node information that the BIER forwarding neighboring node has the capability of processing the target packet format, encapsulating the BIER packet according to the target packet format comprises:
   in a case where the node information comprises a packet format identifier corresponding to a non-Multiprotocol Label Switching (MPLS) BIER packet, determining that the BIER forwarding neighboring node has the capability of processing the target packet format; and
   acquiring a BIER non-MPLS Generic Label (BNMGL) in the node information, and encapsulating the BNMGL and a BIER packet payload in a non-MPLS BIER packet format as an MPLS packet.

2. The method according to claim 1, wherein the node information further comprises at least one of a node identifier or routing information.

3. The method according to claim 1, before setting the node information of the BIER forwarding neighboring node in the BIFT forwarding entry, further comprising:
   receiving at least one piece of BIER information sent by at least one communication node, and creating, according to a respective one piece of BIER information sent by each communication node, a BIFT forwarding entry corresponding to the respective one piece of BIER information; and
   flooding the respective one piece of BIER information sent by the each communication node to one or more communication nodes other than the each communication node, so that the one or more communication nodes other than the each communication node establish a BIFT forwarding entry corresponding to the respective one piece of BIER information.

4. A non-transitory computer-readable storage medium storing a computer program, wherein the computer program, when executed by a processor, implements the Bit Indexed Explicit Replication (BIER) packet forwarding method according to claim 1.

5. A Bit Indexed Explicit Replication (BIER) packet forwarding method, applied to a packet forwarding node, comprising:
   receiving a BIER packet sent by a packet sending node;
   searching for, according to a BIER non-Multiprotocol Label Switching (MPLS) Generic Label (BNMGL) in the BIER packet, a BNMGL incoming label map entry, and in a case of determining according to a search result that the packet forwarding node has a capability of processing a target packet format, parsing the BIER packet to acquire target node information; and
   forwarding the BIER packet according to the target node information;
   wherein in the case of determining according to the search result that the packet forwarding node has the capability of processing the target packet format, parsing the BIER packet to acquire the target node information comprises:
   in a case where the BNMGL incoming label map entry is found according to the BNMGL in the BIER packet, determining that the packet forwarding node has the capability of processing the target packet format existing; and
   removing the BNMGL in the BIER packet, extracting a BIER packet header in a non-MPLS BIER packet format, acquiring, according to a BIFT identifier in the BIER packet header, <Sub-Domain (SD), BitString Length (BSL), Set Identifier (SI) > corresponding to the BIFT identifier, and parsing a BitString in the BIER packet header according to the <SD, BSL, SI> to acquire the target node information.

6. The method according to claim 5, before receiving the BIER packet sent by the packet sending node, further comprising:
   acquiring at least one piece of BIER information sent by at least one communication node, and creating, according to BIER information sent by each communication node, a BIFT forwarding entry corresponding to the BIER information; and
   flooding BIER information of the packet forwarding node to at least one communication node other than the packet forwarding node, and creating a BNMGL incoming label map entry corresponding to the BIER information of the packet forwarding node.

7. The method according to claim 6, wherein flooding the BIER information of the packet forwarding node to the at least one communication node other than the packet forwarding node, and creating the BNMGL incoming label map entry corresponding to the BIER information of the packet forwarding node comprises:
   allocating a BNMGL of the packet forwarding node, including the BNMGL in BIER information in a prefix reachable flooding packet, and flooding the prefix reachable flooding packet to the at least one communication node other than the packet forwarding node; and
   creating the BNMGL incoming label map entry with the BNMGL as a key value, wherein the BNMGL incoming label map entry comprises an operation type and a load mark.

8. A device, comprising:
   at least one processor; and
   a memory configured to store at least one program;
   wherein the at least one program, when executed by the at least one processor, causes the at least one processor to implement the Bit Indexed Explicit Replication (BIER) packet forwarding method according to claim 5.

9. A non-transitory computer-readable storage medium storing a computer program, wherein the computer program, when executed by a processor, implements the Bit Indexed Explicit Replication (BIER) packet forwarding method according to claim 5.

10. A device, comprising:
at least one processor; and
a memory configured to store at least one program;
wherein the at least one program, when executed by the at least one processor, causes the at least one processor to implement:
setting node information of a BIER forwarding neighboring node in a Bit Index Forwarding Table (BIFT) forwarding entry;
in a case of determining according to the node information that the BIER forwarding neighboring node has a capability of processing a target packet format, encapsulating a BIER packet according to the target packet format; and
sending an encapsulated BIER packet to the BIER forwarding neighboring node;
wherein in the case of determining according to the node information that the BIER forwarding neighboring node has the capability of processing the target packet format, encapsulating the BIER packet according to the target packet format comprises:
in a case where the node information comprises a packet format identifier corresponding to a non-Multiprotocol Label Switching (MPLS) BIER packet, determining that the BIER forwarding neighboring node has the capability of processing the target packet format; and
acquiring a BIER non-MPLS Generic Label (BNMGL) in the node information, and encapsulating the BNMGL and a BIER packet payload in a non-MPLS BIER packet format as an MPLS packet.

11. The device according to claim 10, wherein the node information further comprises at least one of a node identifier or routing information.

12. The device according to claim 10, before setting the node information of the BIER forwarding neighboring node in the BIFT forwarding entry, the at least one program, when executed by the at least one processor, causing the at least one processor to further implement:
receiving at least one piece of BIER information sent by at least one communication node, and creating, according to a respective one piece of BIER information sent by each communication node, a BIFT forwarding entry corresponding to the respective one piece of BIER information; and
flooding the respective one piece of BIER information sent by the each communication node to one or more communication nodes other than the each communication node, so that the one or more communication nodes other than the each communication node establish a BIFT forwarding entry corresponding to the respective one piece of BIER information.

* * * * *